United States Patent
Rider et al.

(10) Patent No.: US 9,965,040 B2
(45) Date of Patent: May 8, 2018

(54) METHOD FOR USING MAGNETOMETER TOGETHER WITH GESTURE TO SEND CONTENT TO WIRELESS DISPLAY

(71) Applicant: Intel Corporation, Santa Clara, CA (US)

(72) Inventors: Tomer Rider, Naahryia (IL); Shahar Taite, Kfar saba (IL); Aviv Ron, Klachim (IL); David Kaplan, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/368,338

(22) PCT Filed: Dec. 23, 2013

(86) PCT No.: PCT/US2013/077475
§ 371 (c)(1),
(2) Date: Jun. 24, 2014

(87) PCT Pub. No.: WO2015/099657
PCT Pub. Date: Jul. 2, 2015

(65) Prior Publication Data
US 2016/0291696 A1 Oct. 6, 2016

(51) Int. Cl.
*G06F 3/01* (2006.01)
*G06F 3/14* (2006.01)
(Continued)

(52) U.S. Cl.
CPC .......... *G06F 3/017* (2013.01); *G06F 3/0346* (2013.01); *G06F 3/0484* (2013.01);
(Continued)

(58) Field of Classification Search
CPC ...... G06F 1/1694; G06F 3/017; G06F 3/0488; G06F 2203/04808
See application file for complete search history.

(56) References Cited

U.S. PATENT DOCUMENTS 8,558,759 B1 * 10/2013 Prada Gomez ......... G06F 3/017
345/156
8,941,587 B2 * 1/2015 Kim ...................... G06F 1/1694
345/156

(Continued)

FOREIGN PATENT DOCUMENTS

CN 105849710 A 8/2016
WO WO-2009059065 A1 5/2009

(Continued)

OTHER PUBLICATIONS

"International Application Serial No. PCT/US2013/077475, International Preliminary Report on Patentability mailed Jul. 7, 2016", 6 pgs.

(Continued)

*Primary Examiner* — Ricardo L Osorio
(74) *Attorney, Agent, or Firm* — Schwegman Lundberg & Woessner, P.A.

(57) ABSTRACT

Various systems and methods for using a user gesture to display content on a display are described herein. An apparatus comprises a media module, a gesture module, an angle module, a streaming module, and a network device. The media module displays media content on a display of a computing device; the gesture module detects a gesture control on the computing device; the angle module calculates an angle of the gesture control with respect a reference direction; the streaming module selects a display from a plurality of displays based on the calculated angle; and the network device transmits the media content to the selected display.

18 Claims, 4 Drawing Sheets

(51) Int. Cl.
*G06F 3/0484* (2013.01)
*G06F 3/0488* (2013.01)
*G06F 3/0346* (2013.01)
*H04N 21/41* (2011.01)
*H04N 21/436* (2011.01)
*H04N 21/4363* (2011.01)

(52) U.S. Cl.
CPC ........ *G06F 3/04883* (2013.01); *G06F 3/1454* (2013.01); *H04N 21/4126* (2013.01); *H04N 21/43615* (2013.01); *H04N 21/43637* (2013.01); *G09G 2354/00* (2013.01); *G09G 2370/12* (2013.01); *G09G 2370/16* (2013.01)

(56) References Cited

U.S. PATENT DOCUMENTS

| | | | |
|---|---|---|---|
| 9,128,605 B2* | 9/2015 | Nan | G06F 3/0486 |
| 2010/0162180 A1 | 6/2010 | Dunnam et al. | |
| 2011/0092222 A1 | 4/2011 | Kuo et al. | |
| 2011/0163944 A1 | 7/2011 | Bilbrey et al. | |
| 2011/0237274 A1 | 9/2011 | Wong et al. | |
| 2011/0310100 A1* | 12/2011 | Adimatyam | G06F 3/017 345/420 |
| 2012/0174039 A1* | 7/2012 | Rhoads | H04N 21/4312 715/854 |
| 2012/0174041 A1 | 7/2012 | Queru | |
| 2012/0192108 A1 | 7/2012 | Kolb | |
| 2015/0121466 A1* | 4/2015 | Brands | H04L 65/403 726/4 |

FOREIGN PATENT DOCUMENTS

| | | |
|---|---|---|
| WO | WO-2012144667 A1 | 10/2012 |
| WO | WO-2015099657 A1 | 7/2015 |

OTHER PUBLICATIONS

"International Application Serial No. PCT/US2013/077475, International Search Report mailed Sep. 23, 2014", 3 pgs.

"International Application Serial No. PCT/US2013/077475, Written Opinion mailed Sep. 23, 2014", 4 pgs.

"European Application Serial No. 13900253.9, Extended European Search Report dated Jun. 7, 2017", w/ English Translation, 8 pgs.

* cited by examiner

METHOD FOR USING MAGNETOMETER TOGETHER WITH GESTURE TO SEND CONTENT TO WIRELESS DISPLAY

This application is a U.S. National Stage Application under 35 U.S.C 371 from International Application No. PCT/US2013/077475, filed on Dec. 23, 2013, which is hereby incorporated by reference in its entirety.

BACKGROUND

The introduction of wireless display technologies has allowed users to play media stored on one device on another device. For example, using Intel® WiDi technology, a person may stream video or photos stored on a computer or mobile phone to the person's HDTV.

BRIEF DESCRIPTION OF DRAWINGS

Some embodiments are illustrated by way of example and not limitation in the figures of the accompanying drawings in which.

DETAILED DESCRIPTION

Consider a situation in which a person is in an area with more than one display capable of receiving stream media. For example, the person may be in his or her studio apartment with a large display in a gathering area with couches and a second smaller display in a kitchenette area. Or consider a scenario in which a sales assistant is demonstrating Intel® WiDi capabilities of mobile phone in which there are multiple displays. In such situations, it may be advantageous to quickly be able to select a display for streaming content. In various examples, a user gesture is used on a touch-enabled device for selecting a display from a plurality of displays. For example, a "flicking" gesture may be used in the direction of one of the displays and then that display may be used to present media content.

Figure 1:
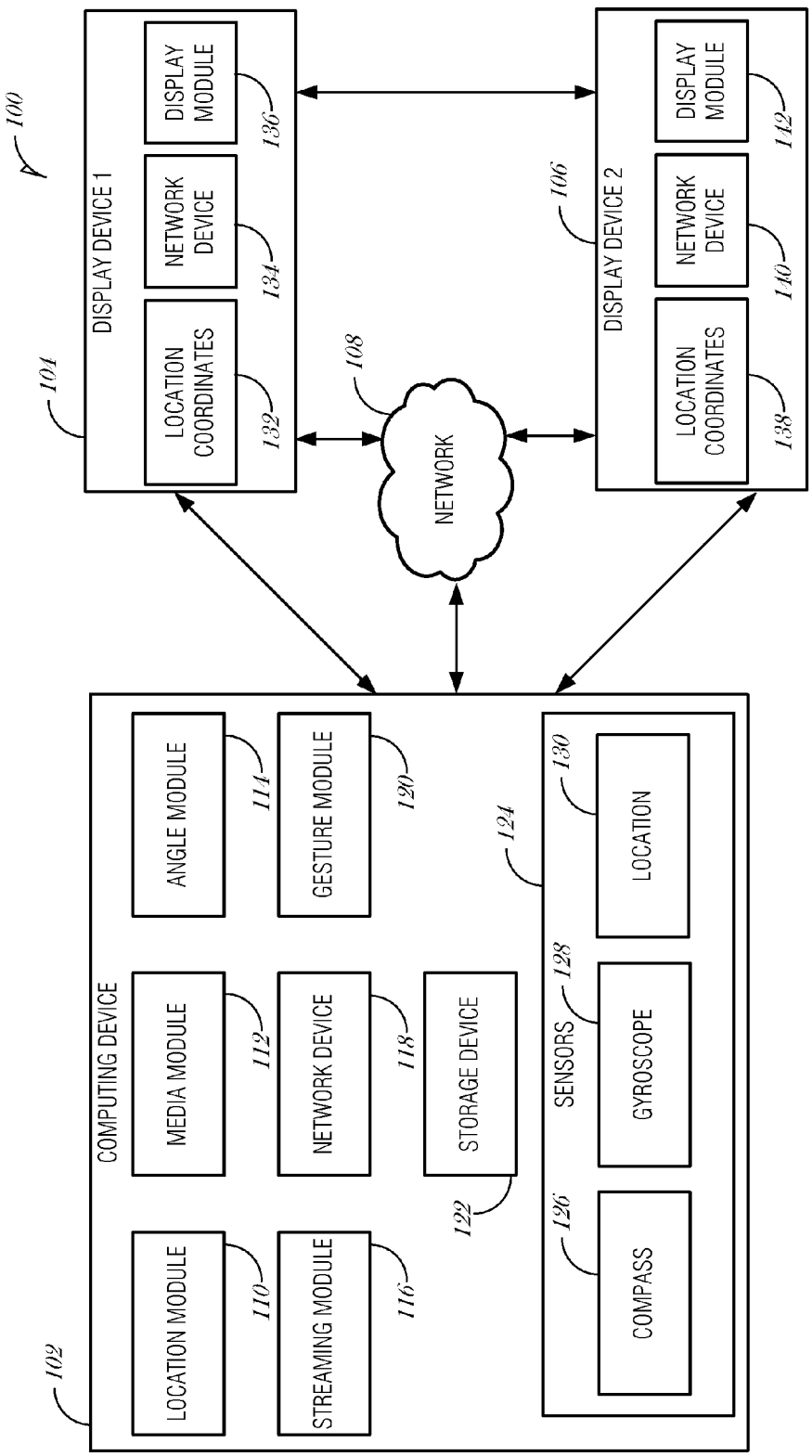
FIG. 1 is a schematic diagram illustrating communication between multiple devices, according to an example embodiment.

FIG. 1 illustrates a schematic diagram 100 illustrating communication between multiple devices, according to an example embodiment. The diagram 100 includes a computing device 102, display device 104, display device 106, and network 108. While functionality of the depicted devices is described with respect to particular modules, functionality may be performed by other modules or combined with other modules. Similarly, the labels of the modules are for illustration purposes and other labels may be used.

In various examples, the computing device 102 includes a location module 110, a media module 112, an angle module 114, a streaming module 116, a network device 118, a gesture module 120, a storage device 122, and sensors 124, which include a compass sensor 126, a gyroscope sensor 128, and a location sensor 130. The displays devices 104, 106 may include location coordinates 132, 138, network devices 134, 140, and display modules 136, and 142, respectively. In various examples, the computing device 102 and display devices 104, 106 may each include a storage device and at least one processing unit (e.g., single-core processor, multi-core processors, multiple processor), wherein the processing unit is configured to execute instructions stored on the storage device to perform functionality described herein.

In various examples, the computing device 102 transmits, or causes another device to transmit, media content to one of display devices 104 or 106 through the use of a touch gesture on a display device of the computing device 102. Media content may include, but is not limited to audio (e.g., MP3, AIFF, WAV), video (e.g., AVI, H.264, MOV, MP4), text (PDF, DOC, HTML), or application content (e.g., web browser).

The computing device 102 and the display devices 104, 106 may communicate through a centralized network and/or direct network connections. The network 108 may include local-area networks (LAN), wide-area networks (WAN), wireless networks (e.g., 802.11 or cellular network), the Public Switched Telephone Network (PSTN) network, ad hoc networks, personal area networks or peer-to-peer (e.g., Bluetooth®, Wi-Fi Direct), or other combinations or permutations of network protocols and network types. The network 108 may include a single local area network (LAN) or wide-area network (WAN), or combinations of LAN's or WAN's, such as the Internet. The various devices coupled to the network 108 may be coupled via one or more wired or wireless connections.

In various examples, the display devices 104,106 are displays, such as High Definition Televisions (HDTVs) or monitors, that are be placed in different locations around a user's home or business. The display devices 104, 106 may be connected to the computing device 102 in different manners. For example, the network device 134 may be part of the display device 104 (i.e., internally), whereas the network device 140 may part of a device that is plugged into a port (e.g., HDMI, USB) of the display device 106. The display modules 136, 142 may present media content received over network devices 134, 140, respectively. The display devices 104, 106 may communicate with the computing device 102 via their respective network devices 134, 140.

In various examples, location coordinates 132, 138 correspond to the locations of the display devices 104, 106. The locations may be stored as geo-coordinates indicating an absolute position of the device (e.g., longitude, latitude, elevation). The locations may be determined by a location sensor (e.g., global positioning system (GPS)), calculated based upon relative locations to locations of known devices (e.g., location beacons, routers, etc.), or entered in by a user.

In various examples, the computing device 102 is a device of the user that has stored media content on the storage device 122, which the user wants to display on one or more of the display devices 104, 106. For example, the computing device 102 may be a mobile phone, laptop, tablet, or personal computer. In an example, the computing device 102 includes one or more media playback applications (e.g., the media module 112). The media module 112 may be used to display media content on a display of a computing device. For example, a user may launch a media playback application using an input device of the computing device 102 and select a movie to watch. The movie may utilize all or a portion of a display of the computing device 102. In various examples, the media content is not directly stored on the computing device 102, but is being streamed from an external source for display on the computing device 102.

The computing device 102 may also include a touch-enabled surface (e.g., resistive or capacitive) that a user utilizes for control of the computing device 102. The touch-enabled surface may be included in a display of the computing device 102, such as the case may be in a tablet or mobile phone, or be a separate surface such as a touchpad of a laptop.

In various examples, the gesture module 120 detects a gesture on touch-enabled surface of the computing device 102. The gesture may be made while a user is watching media content on the computing device 102. In an example, the gesture includes a starting point and an ending point. The starting point may be considered the location (e.g., an [X, Y] coordinate of the touch-enabled surface) at which a user, or other input device such as a stylus, contacts the touch-enabled surface. In various examples, the user continues the gesture by maintaining contact with the touch-enabled surface, and the ending point is location when the user breaks contact with the surface. In various examples, a user may not need to actually make contact with the computing device to make a gesture. For example, a gesture may be triggered by the user, or other device, being within a threshold distance of the computing device 102, in which case the ending point is when the user moves outside of the threshold distance.

Figure 2:
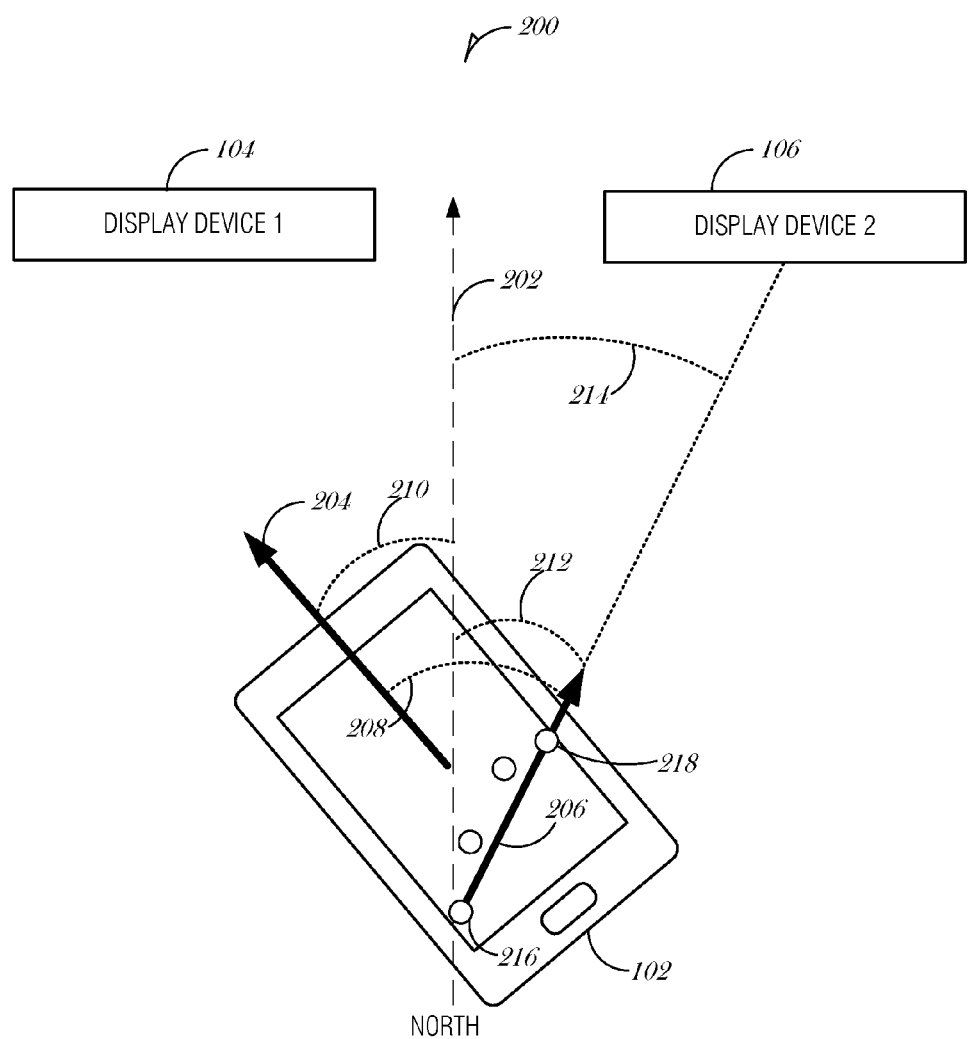
FIG. 2 is a schematic diagram illustrating a gesture control to select a device for displaying media content, in accordance with an example embodiment.

FIG. 2 illustrates a schematic diagram 200 illustrating a gesture control to select a device for displaying content. Diagram 200 includes the computing device 102, display devices 104, 106, a reference direction 202, a device orientation 204, a gesture direction 206, angles 208-214, a gesture starting point 216, and a gesture ending point 218. In various examples, the angle 208 is the angle to the gesture direction 206 with respect to the device orientation 204, the angle 210 is the angle to the reference direction 202 with respect to the device orientation 204, the angle 212 is the angle of the gesture direction 206 with respect to the reference direction 202, and the angle 214 is the angle between the display device 106 and the reference direction 202 with respect to the location of the computing device 102. As illustrated, the angle 212 and 214 are approximately the same, however, in various example the angles are different.

In various examples, the angle module 114 calculates an angle of the gesture with respect the reference direction 202 of the computing device 102. The reference direction may be retrieved from the compass sensor 126 (e.g., a magnetometer), and as illustrated in FIG. 2, the reference direction may be north) (0°). Similarly, the angle 210 may be retrieved from the compass sensor 126. Calculating the angle of the gesture with respect to the reference direction 202 may be accomplished in a number of ways. For example, to determine the angle 212, the angle 210 may be subtracted from the angle 208.

In various examples, to determine the angle 208, the slope of the gesture direction 206 is determined with respect the device orientation 204 by using the coordinates of the gesture starting point 216 and the gesture ending point 218. The coordinates may be retrieved from the gesture module 120. In various examples, the slope of the gesture direction is taken based on the average direction of the gesture. For example, the average slope of various segments (e.g., 1 cm, 1 mm, etc.) may be used. Once the slope has been determined, various known geometric functions may be used to determine the angle 208. For example, if the starting and end points indicate the gesture is moving up and to the right, with respect to the device's orientation, the following formula may be used:

angle 208=90−arctan(slope of the gesture direction 206)

Whereas, if the user gesture is determined to be going down and to the right, the following formula may be used.

angle 208=90+|arctan(slope of the gesture direction 206)|

Similar formulas may be used for other directions of a user gesture, which may result in the angle 208 being in a range of +/−0 to 360 degrees. Furthermore, other geometric functions may be used for determining the angles, including taking in to account elevation of the computing device and the angle of the computing device 102. The angle of the computing device 102 may be determined by accessing gyroscope sensor 128 and an accelerator sensor (not shown) to compensate for drift.

Using FIG. 2 as an example with the formulas above leads to the following approximations of angles 208, 210, and 212. The slope of the gesture direction 206 is approximately 0.5 and is up and to the right. Thus, the angle 208 may be approximately 64 degrees. The angle 210 may be approximately 45 degrees, which yields the angle 212 to be approximately 19 degrees.

In various examples, the angle module 114 calculates angles to display devices with respect to the reference direction 202. The angles to the display devices may be based on the location coordinates of the display devices and the location coordinates of the computing device and calculated similarly to angles 208, 210, and 212 discussed above.

In an example, location module 110 retrieves the locations of the display devices connected to the network 108. In various examples, the display devices may broadcast their respective locations and an associated display identifier. The location module 110 may store the broadcast locations with the associated identifier in the storage device 122. In various examples, the location module transmits a request to a display device via the network 108 to access location coordinate of the display (e.g., location coordinates 132, 138). The locations of the various display devices may be updated periodically (e.g., hourly). For example, a record may be kept of the display identifiers and each time a new display appears on the network 108, or an existing display disappears or and reappears, location coordinates may be updated. Additionally, location coordinates may be updated when a user gesture is detected for transmitting media content to a display device. In an example, the location coordinates are not stored, but are retrieved at the time the user makes the gesture.

In various examples, the streaming module 116 selects a display based on a comparison between the angle 212 and calculated angles of the display devices with respect to the reference direction and location of the computing device 102. Selection may be based on one or more factors, including but not limited to, an angle closeness, an angle exclusion threshold, and user confirmation. In an example, the default selection of a display is the display with an angle to the reference direction closest (e.g., the angle 214) to that of the angle of the gesture control with respect to the reference direction (e.g., the angle 212). For example, with reference to FIG. 2, the angle 214 is similar to the angle 212. Consequently, the streaming module 116 may select display device 106 for presenting media content.

An angle exclusion threshold may be used to limit the selection of a display to displays that are within the angle exclusion threshold. For example, the difference between the angle of the display and angle of the gesture control may be computed for each display, and if there are no displays where the difference is within the angle exclusion threshold, no display may be selected. The angle threshold may be set by a user utilizing the computing device 102 or be set by the media presentation application. The threshold may be dynamic based on the number of displays (e.g., the threshold may get larger as the number of displays goes down).

In various examples, if more than one display has the same calculated difference in angle, or is within a certain number of degrees, a prompt may be displayed on the computing device 102. The prompt may include a listing of the displays with the same or close angles, including an identifier of the display. The user may select one of the displays on the prompt, which may be used for displaying media content.

Figure 3:
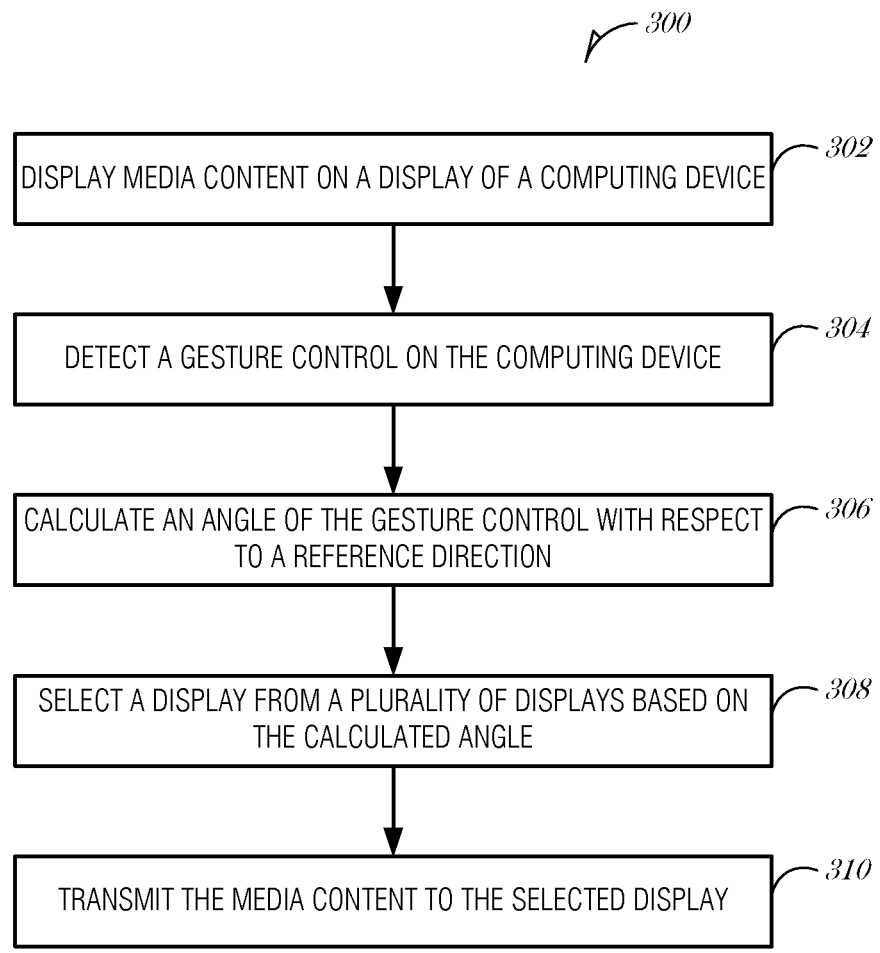
FIG. 3 is a flow chart illustrating a method to use a gesture control to select a device for displaying content, according to an example embodiment.

FIG. 3 is a flow chart illustrating a method 300, in accordance with an example embodiment, to detect a user gesture for transmitting media content to a display. The method 300 may be performed by any of the modules, logic, or components described herein.

In various examples, at block 302, media content is displayed on the display of a computing device. A user may launch a media playback application on the computing device and select the media content for display. In an example, the media playback application includes support for selection of an external display for presenting the media content.

In various examples, at block 304, a gesture control is detected on the computing device. In an example, the gesture control is started in a location of a display of the computing device that is displaying the media content. The detected gesture control may be interpreted by the media playback application as a user request to display the media content on another display. The detected gesture control may include a starting point and an ending point.

In various examples, at block 306, an angle of the gesture control is calculated with respect to a reference direction. The reference direction may be retrieved from a sensor of the computing device. The angle of the gesture with respect to the reference direction may be based on the orientation of the computing device. A first angle based on the orientation of the computing device with respect to the reference direction may be calculated. A second angle based on the direction of the gesture control with respect to the orientation of the computing device may be calculated. The angle with respect to the reference direction may be calculated by subtracting the first angle from the second angle. Various techniques for angle calculation are discussed in more detail above.

In various examples, at block 308, a display of a plurality of displays is selected based on the calculated angle of the gesture control. To select a display, the location coordinates of the displays may be retrieved. The locations may be determined by retrieving them from a storage device, from broadcasts of the display devices, or transmitting a request from the computing device to a display device. Upon determining the location coordinates, angles may be computed to the displays based on the reference direction and location coordinates of the computing device. A comparison may be made between the angles as calculated for the displays and the angle of the gesture control. The display with the closest angle to the gesture angle may be selected. In an example, a check is made to determine if the difference between the display angle and the gesture angle are beyond an angle threshold before selection.

In various examples, at block 310, the media content is transmitted to the selected display. For example, the media playback application may initiate a connection with the selected display (e.g., via an Intel® WiDi link) using network devices of the computing device and selected display. Via the connection, a request may be transmitted to the selected display to display the media content. Upon receiving an acknowledgment from the selected display, the computing device may stream the media content to the display device for presentation.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
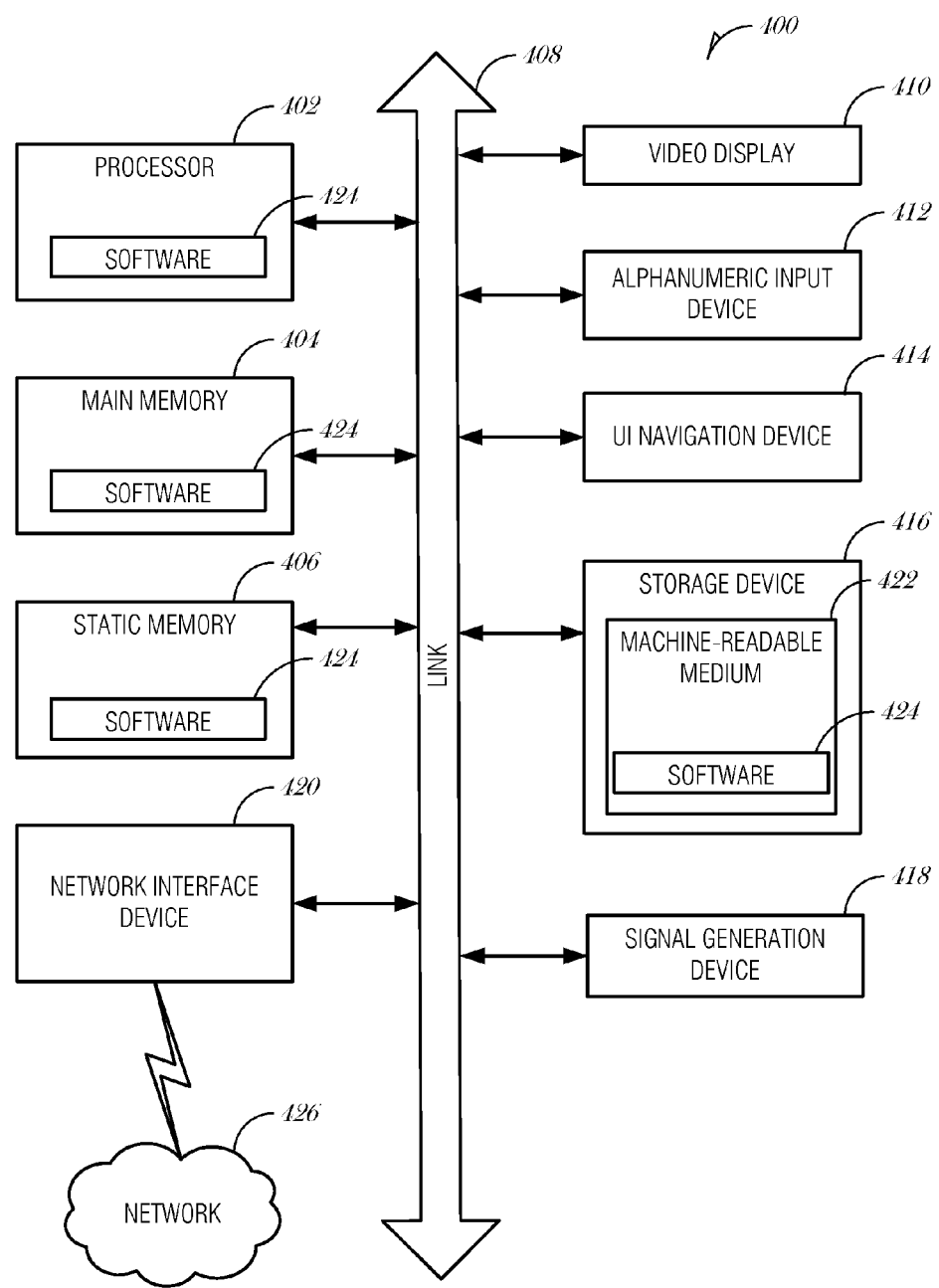
FIG. 4 is a block diagram of machine in the example form of a computer system within which a set instructions, for causing the machine to perform any one or more of the methodologies discussed herein, may be executed.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 includes subject matter (such as a device, apparatus, or machine) comprising an apparatus to use a user gesture to display content on a display, the apparatus comprising: a media module to display media content on a display of a computing device; a gesture module to detect a gesture control on the computing device; an angle module to calculate an angle of the gesture control with respect a reference direction; a streaming module to select a display from a plurality of displays based on the calculated angle; and a network device to transmit the media content to the selected display.

In Example 2, the subject matter of Example 1 may optionally include, wherein to select a display from a plurality of displays based on the calculated angle, the angle module is to: for each of the plurality of displays: determine location coordinates of a respective display of the plurality of displays; calculate an angle to the respective display from the computing device with respect to the reference direction based on the determined location coordinates and location coordinates of the computing device; and compare the angle to the respective display with the angle of the gesture control.

In Example 3, the subject matter of any one or more of Examples 1 to 2 may optionally include, wherein the streaming module is to: select the display of the plurality of displays with the angle to the respective display that is closest to the angle of the gesture with respect to the reference direction.

In Example 4, the subject matter of any one or more of Examples 1 to 3 may optionally include, wherein the streaming module is to: select the display of the plurality of displays with the angle to the respective display closest to the angle of the gesture control when the difference between the calculated respective display angle and the angle of the gesture control is within an angle threshold.

In Example 5, the subject matter of any one or more of Examples 1 to 4 may optionally include, wherein the streaming module is to: determine that there is more than one display of the plurality of displays with an angle to the respective display from the computing device within an angle threshold; and based on the determining, present a prompt on the display of the computing device to select a display of the more than one display.

In Example 6, the subject matter of any one or more of Examples 1 to 5 may optionally include, wherein the location coordinates of a respective display of the plurality of displays are retrieved from a database stored on the storage device of the computing device.

In Example 7, the subject matter of any one or more of Examples 1 to 6 may optionally include, wherein the location coordinates of a respective display of the plurality of displays are retrieved from a broadcast from the respective display.

In Example 8, the subject matter of any one or more of Examples 1 to 7 may optionally include, wherein the angle module is to request the location coordinates from the respective display.

In Example 9, the subject matter of any one or more of Examples 1 to 8 may optionally include, wherein to calculate the angle of the gesture control with respect to a reference direction, the angle module is to: calculate the angle of the gesture control based on the reference direction and orientation of the computing device.

In Example 10, the subject matter of any one or more of Examples 1 to 9 may optionally include, wherein to calculate the angle based on a reference direction and orientation of the computing device, the angle module is to: calculate a first angle based on the orientation of the computing device with respect to the reference direction; calculate a second angle based on the direction of the gesture control with respect to the orientation of the computing device; and subtract the first angle from the second angle to determine the angle of the gesture control.

In Example 11, the subject matter of any one or more of Examples 1 to 10 may optionally include, wherein the streaming module is to transmit a request to the selected display to present the media content on the selected display.

In Example 12, the subject matter of any one or more of Examples 1 to 11 may optionally include, wherein the streaming module is to transmit the media content to the selected display upon receiving an acknowledgement from the selected display.

Example 13 includes or may optionally be combined with the subject matter of any one of Examples 1-12 to include subject matter for using a user gesture to display content on a display (such as a method, means for performing acts, machine readable medium including instructions that when performed by a machine cause the machine to performs acts, or an apparatus configured to perform) comprising displaying media content on a display of a computing device; detecting a gesture control on the computing device; calculating an angle of the gesture control with respect to a reference direction; selecting a display from a plurality of displays based on the calculated angle; and transmitting the media content to the selected display.

In Example 14, the subject matter of Example 13 may optionally include, wherein selecting a display from a plurality of displays based on the calculated angle comprises: for each of the plurality of displays: determining location coordinates of a respective display of the plurality of displays; calculating an angle to the respective display from the computing device with respect to the reference direction based on the determined location coordinates and location coordinates of the computing device; and comparing the angle to the respective display with the angle of the gesture control.

In Example 15, the subject matter of any one or more of Examples 13 to 14 may optionally include, selecting the display of the plurality of displays with the angle to the respective display that is closest to the angle of the gesture with respect to the reference direction.

In Example 16, the subject matter of any one or more of Examples 13 to 15 may optionally include, selecting the display of the plurality of displays with the angle to the respective display closest to the angle of the gesture control when the difference between the calculated respective display angle and the angle of the gesture control is within an angle threshold.

In Example 17, the subject matter of any one or more of Examples 13 to 16 may optionally include, determining that there is more than one display of the plurality of displays with an angle to the respective display from the computing device within an angle threshold; and based on the determining, presenting a prompt on the display of the computing device to select a display of the more than one display.

In Example 18, the subject matter of any one or more of Examples 13 to 17 may optionally include, wherein determining location coordinates of a respective display of the plurality of displays comprises: retrieving the location coordinates from a database stored on the storage device of the computing device.

In Example 19, the subject matter of any one or more of Examples 13 to 18 may optionally include, wherein determining location coordinates of a respective display of the plurality of displays comprises: retrieving the location coordinates from a broadcast from the respective display.

In Example 20, the subject matter of any one or more of Examples 13 to 19 may optionally include, wherein determining location coordinates of a respective display of the plurality of displays comprises: requesting the location coordinates from the respective display.

In Example 21, the subject matter of any one or more of Examples 13 to 20 may optionally include, wherein calculating the angle of the gesture control with respect to a reference direction comprises: calculating the angle of the gesture control based on the reference direction and orientation of the computing device.

In Example 22, the subject matter of any one or more of Examples 13 to 21 may optionally include, wherein calculating the angle based on a reference direction and orientation of the computing device comprises: calculating a first angle based on the orientation of the computing device with respect to the reference direction; calculating a second angle based on the direction of the gesture control with respect to the orientation of the computing device; and subtracting the first angle from the second angle to determine the angle of the gesture control.

In Example 23, the subject matter of any one or more of Examples 13 to 22 may optionally include, transmitting a request to the selected display to present the media content on the selected display.

Example 24 includes or may optionally be combined with the subject matter of any one of Examples 1-23 to include an apparatus comprising means for performing any of the Examples 1-23.

Example 25 includes an apparatus for using a user gesture to display content on a display, the apparatus comprising: means for displaying media content on a display of a computing device; means for detecting a gesture control on the computing device; means for calculating an angle of the gesture control with respect to a reference direction; means for selecting a display from a plurality of displays based on the calculated angle; and means for transmitting the media content to the selected display The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. At least one non-transitory machine-readable medium including instructions to use a user gesture to display content on a selected display, which when executed by a machine, cause the machine to perform operations comprising:
   displaying media content on a display of a computing device;
   detecting a gesture control on the computing device;
   calculating an angle of the gesture control with respect to a reference direction and orientation of the computing device, by:
      calculating a first angle based on the orientation of the computing device with respect to the reference direction;
      calculating a second angle based on the direction of the gesture control with respect to the orientation of the computing device; and
      subtracting the first angle from the second angle to determine the angle of the gesture control;
   selecting a display from a plurality of displays based on the calculated angle, wherein the selecting includes, for each of the plurality of displays:
      determining location coordinates of a respective display of the plurality of displays;
      calculating an angle to the respective display from the computing device with respect to the reference direction based on the determined location coordinates and location coordinates of the computing device; and
      comparing the angle to the respective display with the angle of the gesture control; and
   transmitting the media content to the selected display.

2. The at least one machine-readable medium of claim 1, further comprising:
   selecting the display of the plurality of displays with the angle to the respective display that is closest to the angle of the gesture with respect to the reference direction.

3. The at least one machine-readable medium of claim 1, further comprising:
   selecting the display of the plurality of displays with the angle to the respective display closest to the angle of the gesture control when the difference between the calculated respective display angle and the angle of the gesture control is within an angle threshold.

4. The at least one machine-readable medium of claim 1, further comprising:
   determining that there is more than one display of the plurality of displays with an angle to the respective display from the computing device within an angle threshold; and
   based on the determining, presenting a prompt on the display of the computing device to select a display of the more than one display.

5. The at least one machine-readable medium of claim 1, wherein determining location coordinates of a respective display of the plurality of displays comprises:
   retrieving the location coordinates from a database stored on the storage device of the computing device.

6. The at least one machine-readable medium of claim 1, wherein determining location coordinates of a respective display of the plurality of displays comprises:
   retrieving the location coordinates from a broadcast from the respective display.

7. An apparatus to use a user gesture to display content on a selected display, the apparatus comprising:
   at least one processor;
   a storage device comprising instructions, which when executed by the at least one processor, configure to at least one processor to:
   display media content on the display;
   detect a gesture control;
   calculate an angle of the gesture control with respect to a reference direction and orientation of the computing device, including instructions to:
      calculate a first angle based on the orientation of the computing device with respect to the reference direction;
      calculate a second angle based on the direction of the gesture control with respect to the orientation of the computing device; and
      subtract the first angle from the second angle to determine the angle of the gesture control;
   select a display from a plurality of displays based on the calculated angle, wherein to select the display, the at least one processor is configured to, for each of the plurality of displays:
      determine location coordinates of a respective display of the plurality of displays:
      calculate an angle to the respective display from the computing device with respect to the reference direction based on the determined location coordinates and location coordinates of the computing device; and
      compare the angle to the respective display with the angle of the gesture control; and
   wherein a network device is configured to transmit the media content to the selected display.

8. The apparatus of claim 7, wherein the at least one processor is further configured, when executing the instruction, to:
   select the display of the plurality of displays with the angle to the respective display that is closest to the angle of the gesture with respect to the reference direction.

9. The apparatus of claim 7, wherein at least one processor is further configured, when executing the instruction, to:
   select the display of the plurality of displays with the angle to the respective display closest to the angle of the gesture control when the difference between the calculated respective display angle and the angle of the gesture control is within an angle threshold.

10. The apparatus of claim 7, wherein the at least one processor is further configured, when executing the instruction, to:
   determine that there is more than one display of the plurality of displays with an angle to the respective display from the computing device within an angle threshold; and
   based on the determining, present a prompt on the display of the computing device to select a display of the more than one display.

11. The apparatus of claim 7, wherein the location coordinates of a respective display of the plurality of displays are retrieved from a database stored on the storage device of the computing device.

12. The apparatus of claim 7, wherein the location coordinates of a respective display of the plurality of displays are retrieved from a broadcast from the respective display.

13. The apparatus of claim 7, wherein the at least one processor is further configured, when executing the instruction, to request the location coordinates from the respective display.

14. The apparatus of claim 7, wherein the at least one processor is further configured, when executing the instruction, to transmit a request to the selected display to present the media content on the selected display.

15. The apparatus of claim 14, wherein the at least one processor is further configured, when executing the instruction, to transmit the media content to the selected display upon receiving an acknowledgement from the selected display.

16. A method of using a user gesture to display content on a selected display, the method comprising:
- displaying media content on a display of a computing device;
- detecting a gesture control on the computing device;
- calculating an angle of the gesture control with respect to a reference direction and orientation of the computing device, by:
  - calculating a first angle based on the orientation of the computing device with respect to the reference direction;
  - calculating a second angle based on the direction of the gesture control with respect to the orientation of the computing device; and
  - subtracting the first angle from the second angle to determine the angle of the gesture control;
- selecting a display from a plurality of displays based on the calculated angle, wherein the selecting includes, for each of the plurality of displays:
  - determining location coordinates of a respective display of the plurality of displays,
  - calculating an angle to the respective display from the computing device with respect to the reference direction based on the determined location coordinates and location coordinates of the computing device; and
  - comparing the angle to the respective display with the angle of the gesture control; and
- transmitting the media content to the selected display.

17. The method of claim 16, further comprising:
selecting the display of the plurality of displays with the angle to the respective display that is closest to the angle of the gesture with respect to the reference direction.

18. The method of claim 16, further comprising:
selecting the display of the plurality of displays with the angle to the respective display closest to the angle of the gesture control when the difference between the calculated respective display angle and the angle of the gesture control is within an angle threshold.

* * * * *

UNITED STATES PATENT AND TRADEMARK OFFICE
CERTIFICATE OF CORRECTION

PATENT NO. : 9,965,040 B2  
APPLICATION NO. : 14/368338  
DATED : May 8, 2018  
INVENTOR(S) : Rider et al.

It is certified that error appears in the above-identified patent and that said Letters Patent is hereby corrected as shown below:

On the Title Page

In item (*), in "Notice", in Column 1, Line 3, delete "days. days." and insert --days.-- therefor In the Claims In Column 12, Line 34, in Claim 7, delete "displays:" and insert --displays;-- therefor In Column 14, Line 10, in Claim 16, delete "displays," and insert --displays;-- therefor Signed and Sealed this  
Eleventh Day of June, 2019

Andrei Iancu  
*Director of the United States Patent and Trademark Office*